United States Patent [19]

Lowe

[11] 3,926,972

[45] Dec. 16, 1975

[54] 7-HYDRAZONO AND HYDRAZINO CEPHALOSPORINS

[75] Inventor: Gordon Lowe, Abingdon, England

[73] Assignee: National Research Development Corporation, England

[22] Filed: Feb. 5, 1973

[21] Appl. No.: 329,875

[52] U.S. Cl.......... 260/243 C; 260/239.1; 424/246; 424/271
[51] Int. Cl.².............. C07D 501/18; C07D 499/42
[58] Field of Search...................... 260/243 C, 239.1

[56] References Cited

UNITED STATES PATENTS 3,047,467    7/1962    Doyle et al...................... 260/243 C Primary Examiner—Nicholas S. Rizzo

[57] ABSTRACT

Penicillin or cephalosporin compounds have the 3-position of the 2-azetidone ring substituted by a hydrazono, hydrazino, acylhydrazono or acylhydrazino group.

12 Claims, No Drawings

7-HYDRAZONO AND HYDRAZINO CEPHALOSPORINS

This invention relates to antibiotics and, in particular, to a novel type of intermediate for the preparation of new penicillin and cephalosporin antibiotics and to the antibiotics prepared thereby.

The majority of penicillin and cephalosporin antibiotics so far reported are substituted by an acylamino group at the 3-position of the 2-azetidone ring. It has now been found possible, through the use of novel intermediates analogous to nuclei such as 6-aminopenicillanic and 7-aminocephalosporanic acid, to prepare a new range of semi-synthetic penicillins and cephalosporins having an alternative form of substitution at this position.

The novel intermediates are characterised by the presence of a hydrazono group at the 3-position of the 2-azetidone ring and may be used to prepare both acylhydrazono and acylhydrazino penicillin and cephalosporin antibiotics.

Accordingly, the present invention comprises a penicillin or cephalosporin compound substituted at the 3-position of the 2-azetidone ring by a hydrazono, hydrazino, acylhydrazono or acylhydrazino group.

It will be understood that the term penicillin or cephalosporin compound as used herein is intended to include all penicillin and cephalosporin compounds, for example antibiotics and intermediates for the production thereof, having a fused β-lactam/thiazolidine or β-lactam/dihydrothiazine structure. Compounds of particular interest, however, are those related by way of identity of nucleus and/or acyl group with known penicillin and cephalosporin antibiotics, especially those which are clinically available at the present time such as cephalothin, 7-2'-thienylacetaminocephalosporanic acid and cephaloridine, its corresponding $C_4$ (pyridine) derivative (7-2'-thienylacetamino-ceph-3-em-3-yl methyl) pyridinium 4-carboxylate as well as to the compounds of U.S. Pat. No. 3,219,662 and the corresponding U.K. Pat. No. 966,221, to cephalosporin C itself and to intermediates derived therefore including, for example, 7-aminocephalosporanic acid and related compounds described in U.S. Pat. No. 3,207,755 and 3,202,656, and the corresponding U.K. Pat. No. 953,695 and 966,222, and in U.K. Pat. No. 957,569.

The present invention thus comprises compounds of the formula (I)

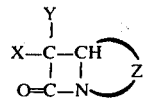

(I)

wherein X and Y together represent a hydrazono or acylhydrazono group, or X represents a hydrazino or acylhydrazino group and Y represents hydrogen, and Z represents a group of the formula

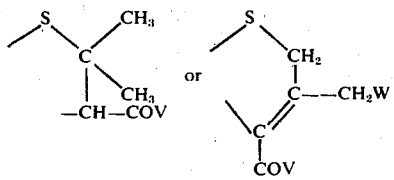

in which COV represents a carboxy group or a salt or ester thereof and W represents hydrogen, a free hydroxy group or a hydroxy group esterified by a carboxylic acid, or the residue of a nucleophile, or COV and W together represent a bridging group, the sulphur atom being bonded to the carbon rather than the nitrogen atom of the 2-azetidone ring.

It will be appreciated, however, that although compounds of particular interest are those which contain a nucleus corresponding apart from variations at the carboxy group or at the 3-position of the cephalosporin ring to that present in 6-aminopenicillanic acid or 7-aminocephalosporanic acid, the present invention in its broadest scope extends to penicillin and cephalosporin compounds in which the nucleus differs from this, for example as described in U.K. Pat. No. 1,273,242, 1,302,002 and 1,300,718.

Hydrazones according to the present invention include compounds of formula (II) and (III)

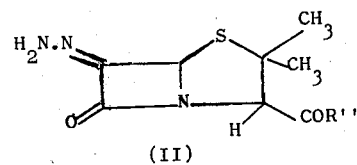

(II)

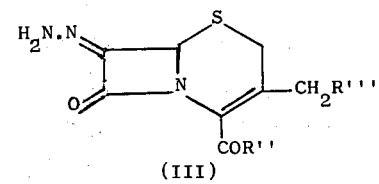

(III)

wherein COR'' represents a carboxy group or a salt or ester thereof, e.g. an alkyl or aralkyl ester (said alkyl and aralkyl groups being substituted or unsubstituted), and R''' represents hydrogen, a free hydroxy group or a hydroxy group esterified by a carboxylic acid, or the residue of a nucleophile, e.g. one which is linked to the methylene group through a sulphur or nitrogen atom, or COR'' and R''' together present a bridging group, e.g. a lactam group —CO·NH— or particularly a lactone group —CO·O—.

It will be appreciated that the hydrazones (and also the acylhydrazones described hereinafter) can exist in syn and anti forms and that boths forms of compound are included within the scope of the invention.

Examples of nucleophilic residues linked to the methylene group through a sulphur or nitrogen atom

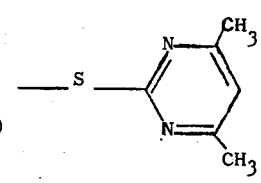

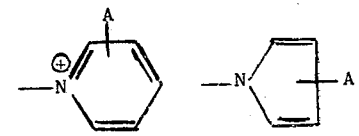

(A being hydrogen or an organic group including a fused benzo group)

Hydrazono compounds of special interest are those of formula (III) in which R''' represents hydrogen, hydroxy, acetoxy or the radical of a weak tertiary heterocyclic base linked to the methylene group through its tertiary nuclear nitrogen atom, particularly 1-pyridyl (i.e. the second of the above formulae with A = H), or in which COR'' and R''' together represent a lactone group —CO·O—.

Specific hydrazono compounds within the scope of the invention include 6-hydrazono-penicillanic acid, 7-hydrazono-3-acetoxymethylceph-3-em-4-carboxylic acid, 7-hydrazono-3-hydroxymethylceph-3-em-4-carboxylic acid lactone, 7-hydrazono-3-methylceph-3-em-4-carboxylic acid and 7-hydrazono-ceph-3-em-3-yl methyl pyridinium 4-carboxylate.

The hydrazono compounds of the present invention are most conveniently prepared by the reduction of a diazo compound, for example of formula (IV) or (V) wherein COR'' and R''' are groups corresponding to those in the hydrazone or are groups convertible to such groups. When the final acylhydrazono or acylhydrazino compound contains a carboxy group or a salt thereof, a diazo compound is usually employed in which COR'' is a group convertible to a carboxy grouping, for example a suitable ester such as a benzyl ester. The conversion to the free acid or salt is then effected as the final stage of the synthesis. Similarly the grouping at the 3-position in cephalosporin derivatives may be present in its final form throughout or modified at a later stage of the synthesis.

Reducing agents suitable for effecting the conversion of the diazo group to a hydrazono group comprise trisubstituted phosphines such as triaryl phosphines, for example triphenyl phosphine, trialkyl phosphines, for example those containing lower alkyl groups such as trimethyl- and triethyl phosphine, and triaralkyl phosphines, for example tribenzyl phosphine. Of these, triphenyl phosphine is preferred. These reducing agents have the additional advantage that the hydrazone compound, which is somewhat unstable particularly in the penicillin series, can be obtained in the form of a stable complex with the oxide of the tri-substituted phosphine. The reduction is generally effected in an aqueous medium which may be inhomogeneous, for example chloroform/water, or homogeneous, for example aqueous dioxan, aqueous dimethylformamide or aqueous tetrahydrofuran. The reduction may conveniently be carried out at room temperature, i.e. in the range 15°–25°C, e.g. at about 20°C.

The hydrazono compounds of the present invention may be used as starting materials for the preparation of a wide variety of compounds containing acylhydrazono and acylhydrazino groups.

The term acylhydrazino group as used herein is intended to include groups

as well as groups RCONH·NH—, and also includes N-substituted groups of both types, e.g. RCONX·NH— and

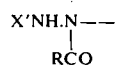

R and X' being organic groupings. Similarly the term acylhydrazono group includes groups RCONH·N= and RCONX·N=, R and X' being organic groupings.

Acylhydrazones and acylhydrazines according to the present invention include compounds of formulae (VI) and (VII), and (VIII) and (IX), respectively.

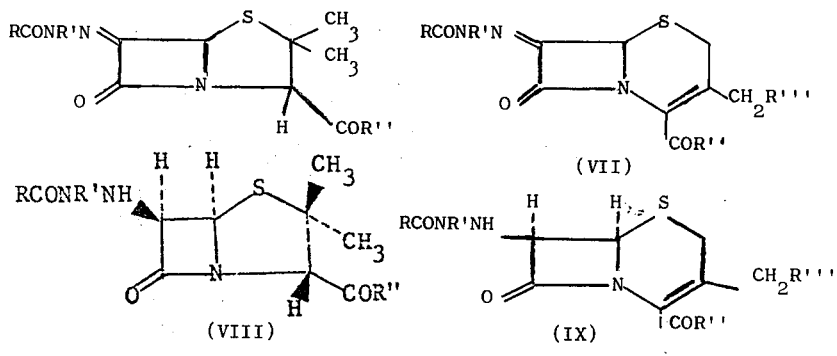

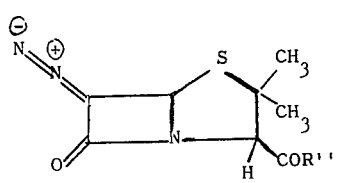

(IV)

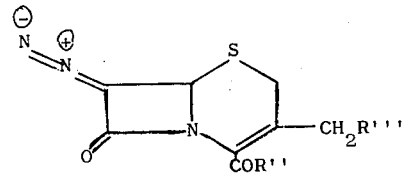

(V)

wherein R is an organic group, R' is hydrogen or an organic grouping, e.g. an alkyl or aryl group which may be substituted or unsubstituted and COR'' and R''' are as defined for formulae (II) and (III).

The organic groups represented by R include any of those present in known acylamino penicillin and cephalosporin antibiotics including, for example, any of those groups described or referred to in U.K. Pat. Nos. 966,221, 966,222 and 1,273,242.

Particularly, R may be an unsubstituted or substituted alkyl group, for example a straight or branched chain aliphatic hydrocarbon radical containing up to 21 carbon atoms but preferably up to thirteen carbon atoms and especially from one to four or seven carbon atoms, such as methyl, ethyl, propyl, isopropyl, butyl, isobutyl, t-butyl, amyl, hexyl, 2-ethylhexyl and heptyl, which is unsubstituted or substituted by an alkoxy or particularly an aryl or aryloxy or heterocyclic group (which groups may themselves contain substituents such as nitro, chloro, alkyl and alkoxy groups) and optionally also by additional substituents such as alkyl, amino, amido, sulphonamido, carboxy and carbalkoxy groups. Examples of R are may be introduced using acetic anhydride and a phenacetyl group by using phenacetyl chloride in pyridine. Although the free hydrazono compound may be isolated from its complex with a trisubstituted phenyl oxide, e.g. by preparative layer chromatography on silica gel, and used in this reaction, it is generally more convenient to employ the complex itself, particularly in view of the tendency to instability shown by the free hydrazono compounds.

Acylhydrazines containing the group RCONH·N= such as those of formulae (VIII) and (IX) with R'=H are most conveniently obtained from an appropriate hydrazono compound by first preparing the acylhydrazono derivative, as described above, and then reducing this in a stereoselective fashion with a suitable reagent to give the compound in which the hydrogen atoms on the 2-azetidinone ring are in the cis configurations. Sodium borohydride is particularly suitable for this reduction, but in order to obtain a tractable product it is important, particularly in the penicillin series,

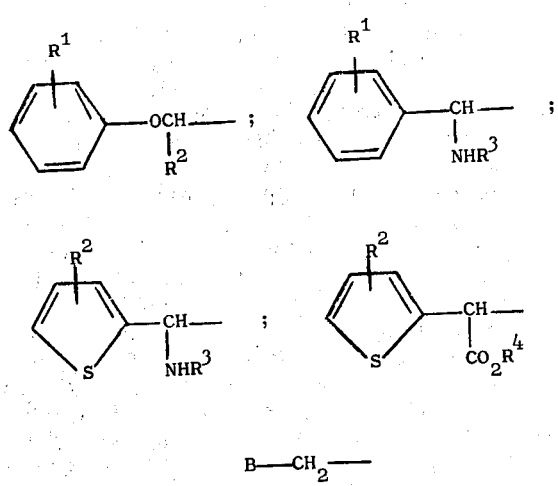

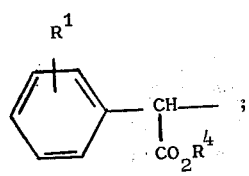

wherein $R^1$ is hydrogen or an organic group, $R^2$ is hydrogen or an alkyl or aryl group, $R^3$ is hydrogen or an alkyl, aryl, acyl or sulphonyl group, $R^4$ is hydrogen, a metal ion or an alkyl group and B is a heterocyclic ring. Groups R containing heterocyclic rings include thienylmethyl, for example 2-thienylmethyl, and tetrazolylmethyl.

In the compounds of formulae (VI) to (IX), preferably the group R' is hydrogen whilst COR" is a carboxy group or a salt thereof. Preferred groups R''' are as described for the compounds of formulae (II) and (III).

Specific compounds within the scope of the invention include the 6-acylhydrazono and 6β-(2'-acylhydrazino), and 7-acylhydrazono and 7β-(2'-acylhydrazino) analogues, respectively, of the specific 6-hydrazono-penicillins and 7-hydrazono-cephalosporins listed herein.

Acylhydrazones containing the group RCONH·N= (R being an organic group) such as those of formulae (VI) and (VII) with R'=H are obtained by acylation of an appropriate hydrazone, for example with an organic monocarboxylic acid chloride, RCOCl, or functional derivative thereof. Thus, for example, an acetyl group that the basicity of the reaction medium is controlled, for example by the use of solid carbon dioxide. Another reducing system which may be used is zinc/glacial acetic acid. The preparation of such acylhydrazino compounds by direct acylation of the hydrazino compound introduces problems owing to the presence of two reactive amino groups.

N-substituted hydrazines, for example of formulae (VIII) and (IX) with R'= an organic group, may be obtained via reaction of the hydrazone, or the corresponding hydrazine obtained by reduction thereof, with an aldehyde or ketone. Thus an azine containing the group $CH_2 = N·N =$ may be formed by the reaction of formaldehyde with the hydrazone, which after reduction to the N-methylhydrazine may be acylated. Alternatively, the hydrazine may be reacted with formaldehyde in order to form a hydrazone of the form $CH_2 = N·NH—$, which may be acylated and then reduced to give a N-methylhydrazine containing the group

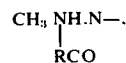

R being an organic group.

The present invention further includes pharmaceutical compositions comprising acylhydrazono and particularly acylhydrazino compounds as described above, including compounds in the form of non-toxic physiologically acceptable salts, together with a physiologically acceptable diluent or carrier.

Suitable salts include metallic salts such as those with sodium and potassium, and also calcium, aluminium, and the ammonium ion and various substituted ammonium ions. When the acylhydrazones and acylhydrazines contain a carboxy group and strongly basic group, e.g. primary amino or pyridinium, the products are amphoteric and normally exist in the zwitterion form but can form acid addition salts, as with non-toxic physiologically acceptable organic and inorganic acids.

The antibiotic compositions may be presented in various forms as appropriate, for example as compositions for parenteral administration, which are therefore preferably sterile and pyrogen free, or for oral administration in the presence of conventional solid carrier materials.

The invention is illustrated by the following examples:

EXAMPLE 1

Preparation of trichloroethyl 7-diazo-3-methylceph-3-em-4-carboxylate

To a solution of trichloroethyl 7-amino-3-methyl-ceph-3-em-4-carboxylate (345mg) in methylene chloride (10ml) is added isoamyl nitrite (500mg) with stirring and cooling to 0°. A solution of formic acid (5 ml) in methylene chloride (500 ml) is then immediately added dropwise to the stirred and cooled reaction mixture during 10 minutes at 0°. Stirring is continued for further 30 minutes at the same temperature and the mixture is then poured into an excess amount of saturated $NaHCO_3$ aqueous solution. After stirring for a short time, the organic layer is separated, washed with brine and dried over anhydrous magnesium sulphate. The solvent is evaporated to give a syrup, which is purified by preparative layer chromatography on silica gel using methylene chloride as an eluant. The first fraction is evaporated to give trichloroethyl 7-diazo-3-methylceph-3-em-4-carboxylate as a pale yellow oil (178mg), $v_{max}$(liq) 2090, 1765, 1740 $cm^{-1}$.

EXAMPLE 2

Preparation of trichloroethyl 7-hydrazono-3-methylceph-3-em-4-carboxylate

A solution of trichloroethyl 7-amino-3-methylceph-3-em-4-carboxylate (21g), methylene chloride (300ml) and isoamyl nitrite (15g) is treated with a solution of formic acid (6g) in methylene chloride (100ml) and worked up in the same manner as described in example 1. The methylene chloride solution, which is dried over magnesium sulphate, is filtered and triphenylphosphine (15g) is added to the filtrate. After stirring the mixture for a short time, it is evaporated to dryness and the residue is dissolved in a small amount of chloroform and chromatographed on silica gel using chloroform as eluant to give two fractions. The fraction which is eluted first is evaporated to give a residue which is triturated in benzene to give, after filtration, the α-form of trichloroethyl 7-hydrazono-3-methylceph-3-em-4-carboxylate as colourless crystals (200mg), m.p. 132°–135°, $v_{max}$(nujol) 2470, 3440, 3240, 1765, 1732, 1640, 1625 $cm^{-1}$, $v_{max}$(CHCl$_3$) 3450, 3300, 3200, 1750, 1730, 1612 $cm^{-1}$.

The second fraction is evaporated to give a semi-solid, which is triturated in benzene to give the β-form of trichloroethyl 7-hydrazono-3-methylceph-3-em-4-carboxylate as colourless scales (7.0g), m.p. 179°–180°, $v_{max}$(nujol) 3440, 3320, 3220, 1755, 1725, 1630 $cm^{-1}$, $v_{max}$(CHCl$_3$) 3450, 3300, 3200, 1777, 1735, 1615 $cm^{-1}$.

The two forms of the compound differ in the stereochemical configuration about the hydrazono group, having a syn and anti relationship.

EXAMPLE 3

Preparation of 7-Phenylacetylhydrazono-3-methylceph-3-em-4-carboxyic-acid a. Trichloroethyl 7-phenylacetylhydrazono-3-methylceph-3-em-4-carboxylate Trichloroethyl 7-hydrazono-3-methylceph-3-em-4-carboxylate (β-form) (7.16 g) is dissolved in acetonitrile (400ml) and after adding bis-trimethylsilylacetamide (5ml) the solution is stirred for 1 hour at room temperature. To this stirred solution is added dropwise in a few minutes a solution of phenylacetyl chloride (10g) in acetonitrile (50ml) and the reaction mixture is stirred at about 10° for 1 hour. The mixture is then poured into saturated $NaHCO_3$ aqueous solution, the organic layer is separated, the aqueous layer is extracted several times with ethyl acetate and all of the organic layers are combined. The combined organic solution is washed with brine and dried over anhydrous magnesium sulphate. Evaporation of the solvents gives an oily residue, which is purified by preparative layer chromatography on silica gel using a mixture of methylene chloride and acetonitrile as eluant. After evaporation, the first fraction gives the α-form (the two forms again having a syn and anti relationship) of trichloroethyl 7-phenylacetylhydrazono-3-methylceph-3-em-4-carboxylate as an oily material (2.8g), $v_{max}$(liquid) 3220, 1770, 1710, 1680 $cm^{-1}$, $\lambda_{max}$(EtOH) 266mμ (16,300). The second fraction gives a mixture of α- and β-forms as an oil (5.5g). The third fraction gives the β-form as a semi-solid (2.9g), $\lambda_{max}$(nujol) 3220, 1780, 1733, 1670 $cm^{-1}$, $v_{max}$(EtOH) 264mμ (16,500).

b. 7-Phenylacetylhydrazono-3-methylceph-3-em-4-carboxylic acid

To a solution of trichloroethyl 7-phenylacetylhydrazono-3-methylceph-3-em-4-carboxylate (2g of a mixture of α- and β-forms) in glacial acetic acid (80ml) is added powdered zinc (6g) at 20° with stirring. Stirring is continued for 2 hours at the same temperature and the insoluble material is filtered off and washed with ethyl acetate. The filtrate and the washings are evaporated to dryness and the residue is dissolved in $NaHCO_3$ aqueous solution. The aqueous solution is extracted with ethyl acetate at a diminishing pH, by gradual addition of 10% HCl to the solution, to give several fractions. The extracts obtained at a pH of 6 down to 4 are concentrated to give a residue (350mg) which is purified by preparative layer chromatography on silica gel ($C_6H_6$:EtOAc:HOAc = 9:3:1) to give 7-phenylacetyl-hydrazono-3-methylceph-3-em-4-carboxylic acid as crystals of m.p. 176°–9° from acetone, $v_{max}$(nujol) 3170, 1777, 1700, 1660, 1652 $cm^{-1}$, $\lambda_{max}$(EtOH) 261mμ (17360).

The ethyl acetate extracts obtained at a pH of 4 down to 2 give 7β-(2'-phenylacetyl-hydrazino)-3-methyl-ceph-3-em-4-carboxylic acid (350mg) as an amorphous powder. This compound is identical with product of example 4(b) but is contaminated by a small amount of by-product having $v_{max}$(nujol) 3300, 1770, 1710, 1660 cm$^{-1}$, which may be the epimer at the 7-position of cephalosporin ring.

EXAMPLE 4

Preparation of
7β-(2'-phenylacetylhydrazino)-3-methylceph-3-em-4-carboxylic acid a. Trichloroethyl 7β-(2'-phenylacetylhydrazino)-3-methylceph-3-em-4-carboxylate i. A mixture of the α- and β-forms of trichloroethyl 7-phenylacetyl-hydrazono-3-methylceph-3-em-4-carboxylate (7.5g of the mixture of fractions obtained by chromatography in example 3) is dissolved in a mixture of tetrahydrofuran (150ml) and water (3ml) and the solution is stirred in an ice-water bath. To the stirred and cooled solution is added powdered sodium borohydride (0.9g) in portions during 5 minutes. After stirring for a further 5 minutes, the reaction mixture is neutralized with small amount of dry-ice and the mixture is poured into a small amount of water. After evaporation, the residue is dissolved in methylene chloride, and the solution is washed with brine and dried over anhydrous magnesium sulphate. After evaporation of the solvent, the residue is dissolved in a small amount of methylene chloride and chromatographed on silica gel. Elution is effected first with methylene chloride and then with a mixture of methylene chloride and acetonitrile, the proportion of acetonitrile being increased gradually from 1/30 to 1/15. The first fraction gives starting material (1.2g) on the evaporation of the solvent, whilst the second fraction gives trichloroethyl 7β-(2'-phenylacetyl-hydrazino)-3-methylceph-3-em-4-carboxylate as an oil (886mg), $v_{max}$(nujol) 3280, 1770, 1740, 1660 cm$^{-1}$.

ii. To a solution of a mixture of the α- and β-forms of trichloroethyl 7-phenylacetylhydrazono-3-methylceph-3-em-4-carboxylate (6g, from Example 3) and β-trichloroethanol (12ml) in dry tetrahydrofuran (120ml) is added powdered sodium borohydride (0.36 g) in portions during 10 minutes with stirring and cooling to 10°. Stirring is continued for 2 hours at the same temperature and the reaction mixture is then neutralized with small pieces of dry-ice and the mixture is poured into water. Repeated extraction with ethyl acetate, washing of the extracts with brine and evaporation the solvent after drying over anhydrous magnesium sulphate yields an oily residue. The residue is dissolved in a small amount of methylene chloride and chromatographed on silica gel using methylene chloride as an eluant. After the starting materials have been eluted, a mixture of methylene chloride and ethyl acetate, in which the content of ethyl acetate is gradually increased to 33%, is used for further elution. A proportion of the starting materials (as a mixture of α- and β-forms) is recovered (1.45g) and the yield of the trichloroethyl 7β-(2'-phenylacetyl-hydrazino)-3-methylceph-3-em-4-carboxylate is 2.7 g. This compound is identified with the product obtained in (i) by comparison of IR spectra, etc.

b. 7β-(2'-phenylacetylhydrazino)-3-methylceph-3-em-4-carboxylic acid

Trichloroethyl 7β-(2'-phenylacetylhydrazino)-3-methylceph-3-em-4-carboxylate (500mg) is dissolved in glacial acetic acid (20ml) and the solution is stirred in an ice water bath. To this stirred and cooled solution zinc powder (1.5g) is added portionwise and the mixture is stirred in the same bath for 2 hours. The reaction mixture is poured into water and washed several times with ether. The aqueous layer is then extracted with ethyl acetate, the ethyl acetate extracts are collected, dried over anhydrous magnesium sulphate and the solvent is evaporated to give an amorphous solid (200mg). Thin layer chromatography (silica gel, $C_6H_6$:EtOAc:HOAc, 9:3:1) shows only one spot corresponding to 7β-(2'-phenylacetylhydrazino-3-methylceph-3-em-4-carboxylic acid, $v_{max}$(nujol) 3300, 1765, 1720, 1645 cm$^{-1}$, $\lambda_{max}$ ($H_2O$ containing 2% dimethyl formamide) 256 mμ (5500).

EXAMPLE 5

Preparation of trichloroethyl
7-acetylhydrazono-3-methylceph-3-em-4-carboxylate

Trichloroethyl 7-hydrazono-3-methylceph-3-em-4-carboxylate (118mg-βform) is dissolved in acetic anhydride (10ml) and, after the addition of pyridine (3 drops), the mixture is stirred at room temperature for 2 hours. Saturated $NaHCO_3$ aqueous solution is added to the reaction mixture and the mixture is extracted with methylene chloride. The extracts are combined, washed with aqueous $NaHCO_3$ solution and dried over anhydrous magnesium sulphate. Evaporation of the solvent gives a residue which is chromatographed on silica gel using a mixture of $C_6H_6$ and EtOAc (3:1) as eluant. After recovering the starting material as the first fraction, evaporation of the main fraction gives the trichloroethyl 7-acetylhydrazono-3-methylceph-3-em-4-carboxylate as an amorphous solid (67mg), m.p. 165°–175° (decomp.), $v_{max}$(nujol) 3220, 1785, 1735, 1670, 1630, $\lambda_{max}$(EtOH) 262m μ (17,421).

EXAMPLE 6

Preparation of benzyl 6-diazo-penicillinate a. Benzyl penicillin benzyl ester

Penicillin G sodium salt (3.56g.) and benzyl bromide (2.05g.) are stirred together in dimethyl formamide (150 ml.) for 2 hours at 20°. The mixture is poured into 500 ml. of crushed ice and water and extracted with ether (2 × 200 ml.). The combined ether layers are washed with brine, dried and reduced in volume to 100 ml. The ethereal solution is then poured into light petroleum (500 ml.) and after 1 hour the light petroleum is decanted. The residual oil is taken up in dry ether. Thin layer chromatography (CHCl$_3$) on silica gel gives a single spot at $R_F$ 0.2. Removal of the ether gives a colourless gum, 3.79 g. (85%), $v_{max}$ (CCl$_4$): 3350, 1785, 1740, 1690, 1510 cm$^{-1}$.

b. N-Nitroso-penicillin G benzyl ester

Dinitrogen tetroxide (12.5 g.) is dissolved in chloroform (50 ml. at −5°. To 25 ml. of this stirred solution is added anhydrous sodium acetate (12 g.) and penicillin G benzyl ester (3.45 g.) in chloroform (50 ml.), the latter addition in aliquots over 20 minutes. The remaining dinitrogen tetroxide solution is then added and stirring continued for a further 30 minutes at −5°. The mixture is diluted with chloroform and washed once with sodium bicarbonate solution, twice with water, and then once with brine. After drying the solvent is removed in vacuo at 20° to give a yellow gum (3.65 g., 98%).

c. Benzyl 6-diazo-penicillanate

The N-nitroso derivative (0.297 g.) in chloroform (25 ml.) is stirred rapidly at 20° with saturated sodium bicarbonate solution (75 ml.) for 4 hours. The chloroform layer is washed with water and brine and then dried. The mixture is purified by preparative layer chromatography on silica gel. Two elutions with a mixture of light petroleum/ether (7:3) gives pure benzyl 6-diazo-penicillanate, (0.05 g,24%) $v_{max}$ (CHCl$_3$): 2090, 1750 cm$^{-1}$.

EXAMPLE 7

Preparation of benzyl 6-hydrazono-penicillinate a. Benzyl 6-hydrazono-penicillanate/triphenyl phosphine oxide adduct N-Nitroso-penicillin G benzyl ester (prepared from 3.5 g. penicillin G benzyl ester) is dissolved in chloroform (50 ml.) and stirred with saturated sodium bicarbonate solution (150 ml.) for 5 hours at 20°. After separating the chloroform layer, washing once with water and drying, triphenyl phosphine (2.6 g., 10 mmole) is added and the mixture stirred vigorously at 20° for 30 minutes. Water (about 1 ml.) is then added and vigorous stirring continued for a further 30 minutes. The chloroform solution is washed with brine and dried. Removal of the chloroform in vacuo gives a light amber coloured gum (6.0 g.). The crude product is purified on silica gel preparative layer chromatography plates, eluting twice with chloroform. The broad band corresponding to the required adduct is extracted with chloroform to give a pale amber gum. The gum is taken up in ether (30 ml.) with warming, and as the last trace dissolves, pale yellow crystals appear spontaneously. Yield 1.95 g, m.p. 124°–124°. Recrystallisation from ether gives m.p. 123.5°–125°.

b. Benzyl 6-hydrazono-penicillanate

Benzyl 6-hydrazono-penicillanate is liberated from its triphenyl phosphine oxide adduct (0.05 g.) by preparative layer chromatography. Multiple elution from silica gel with a non polar mixture of ether/light petroleum (7:3) gives two broad bands, that of the free hydrazone having the higher $R_F$. The product (0.017 g.) is extracted with chloroform, $v_{max}$ 3400, 3300, 1770, 1740, 1620 cm$^{-1}$.

EXAMPLE 8

Preparation of 6-acetylhydrazono penicillanic-acid a. Benzyl 6-acetylhydrazono-penicillanate Benzyl 6-hydrazono-penicillanate/triphenyl phosphine oxide adduct (0.06 g.) is treated with acetic anhydride (ca. 2 ml.) and pyridine (5 drops) for 3 hours at 20°. The mixture is diluted with dichloromethane and stirred vigorously with a saturated aqueous solution of sodium bicarbonate for 2 hours. The organic layer is washed with water and brine and then dried. Removal of the solvent at 20° gives a colourless gum. The triphenyl phosphine oxide is removed by preparative layer chromatography. Two elutions with a mixture of ether/light petroleum (7:3) gives the pure acetyl hydrazone derivative (0.025 g.), having a higher $R_F$ value than the triphenyl phosphine oxide, $v_{max}$ (CHCl$_3$): 1775, 1735, 1700, 1660 cm$^{-1}$.

b. 6-acetylhydrazono-penicillanic acid

Hydrogenolysis of benzyl 6-acetylhydrazono-penicillanate is carried out in an open-ended system, in which hydrogen, first passed through a solution of alkaline potassium permanganate and then through water, is bubbled in a fine rapid stream through the reaction vessel at a rate sufficient to give effective agitation. 10% Palladium on charcoal (0.09 g.) in ethanol (1 ml.) is first saturated with hydrogen for 15 minutes. The benzyl ester (0.03 g.), dissolved in ethanol (0.5 ml.) is then added, and hydrogen passed through the mixture for 30 minutes, after which time thin layer chromatography shows only a trace of starting material and an intense streak from the baseline. The mixture is filtered through Celite and the catalyst washed with a little ethanol. After removal of the ethanol in vacuo the residual gum is brought into a solution at pH 7.5 by the addition of water (1 ml.) and dropwise addition of saturated sodium bicarbonate solution. The aqueous solution is extracted once with ether and then freeze dried, giving 0.015 g. of the penicillanic acid sodium salt. Acidification of the salt gives the free acid.

Esterification of the free acid with diazomethane in ethanol gives after preparative layer chromatography purification, methyl 6-acetylhydrazono-penicillanate, $v_{max}$ (CHCl$_3$): 1780, $\lambda_{max}$ (EtOH): 267 mμ ($\epsilon$= 19,500).

EXAMPLE 9

Preparation of 6β-(2'-acetylhydrazino)-penicillanic acid a. Benzyl 6β-hydrazino-penicillanate Benzyl 6-acetylhydrazono-penicillanate (0.024 g.) is dissolved in dry isopropanol (0.5 ml.), the solution is cooled to 0° and a piece of solid carbon dioxide about the size of a grain of rice added. When effervescence had ceased, sodium borohydride (7ml. of 0.05M solution in dry isopropanol) is added and the reaction mixture stirred at 0° for 30 minutes and then at 20° overnight. The mixture is then acidified to pH 3 with aqueous acetic acid, then water (10 ml.) is added and the mixture stirred for 15 minutes. The aqueous mixture is shaken with ethyl acetate, and the ethyl acetate layer is washed with sodium bicarbonate solution and brine. After drying and removal of the solvent in vacuo at 20°, a colourless gum (0.018 g.) is obtained. Preparative layer chromatography (1 elution with ether/light petroleum (7:3) followed by 2 elutions with chloroform) gives starting material (0.004 g.) and benzyl 6β-(240-acetylhydrazino)-penicillanate as a colourless gum (0.003 g.), [α]$_D^{20}$ + 120° (C. 0.3, CHCl$_3$), $v_{max}$ (CCl$_4$) 3300, 1775, 1740, 1685, 1550 cm$^{-1}$.

b. 6β-(2'-acetylhydrazino)-penicillanic acid

The freeze-dried sodium salt is obtained from the benzyl ester by the hydrogenolysis procedure of Example 8. Acidification of the salt gives the free acid.

EXAMPLE 10

Preparation of 6-phenylacetylhydrazono-penicillanate acid a. Benzyl 6-phenylacetylhydrazono-penicillanate Benzyl 6-hydrazono-penicillinate/triphenyl phosphine oxide adduct (0.17 g.) is dissolved in dichloromethane (2 ml.), the solution cooled in an ice-bath and stirred with phenylacetyl chloride (0.06 g.) and pyridine (0.035 g.) for 1 hour. The mixture is diluted with dichloromethane and stirred vigorously with saturated sodium bicarbonate solution for 15 minutes. The organic layer is separated and washed with water and then dried. The amber gum remaining after removal of solvent is eluted 4 times with ether/light petroleum (1:1) on 1 mm preparative layer chromatography plates, yielding the pure benzyl 6-phenylacetylhydrazono-penicillanate (0.07 g., 80%), $[\alpha]_D^{20} = +268°$ (C. 0.3, CHCl$_3$), $v_{max}$ (CHCl$_3$) 1780, 1745, 1695, 1660 cm$^{-1}$, $\lambda_{max}$ (EtOH) 269m$\mu$ ($\epsilon$= 18,000).

b. 6-phenylacetylhydrazono-penicillanic acid 6-phenylacetylhydrazono-penicillanic acid is obtained as the freeze-dried sodium salt by hydrogenolysis of the benzyl ester, using the method described in Example 8. The free acid is obtained by acidification of the sodium salt and may be converted to a crystalline dicyclohexylamine salt in ethyl acetate solution. Crystallisation of the dicyclohexylamine salt from benzene/-light petroleum gives colourless crystals, m.p. 148°–150° dec., $[\alpha]_D^{20}$ +203° (C.0.07, CHCl$_3$).

EXAMPLE 11

Preparation of 6β-(2′-phenylacetylhydrazino)-penicillanic acid a. Benzyl 6β-(2′-phenylacetylhydrazino)-penicillanate Benzyl 6-phenylacetylhydrazino-penicillinate (0.025 g.) is treated with an 0.05M solution of sodium borohydride in dry isopropanol using a piece of solid carbon dioxide to buffer the solution as described for the acetyl analogue in Example 9. After the same work-up procedure, the gum, containing product (R$_F$ 0.3) and starting material (R$_F$ 0.5), is treated by preparative layer chromatography. One elution with ether gives starting material (0.005 g.) and the 6β-phenylacetylhydrazino derivative (0.008 g.), $v_{max}$ (CHCl$_3$) 3440, 1770, 1735, 1675 cm$^{-1}$.

b. 6β-(2′-phenylacetylhydrazino)-penicillanic acid

6β-(2′-phenylacetylhydrazino)-penicillanic acid is obtained from the benzyl ester as the freeze-dried sodium salt by the hydrogenolysis procedure of Example 8, $[\alpha]_D^{20} = +132°$ (C. 0.07, CHCl$_3$).

Note

All temperatures are given in degrees Centigrade, the light petroleum used is the fraction of boiling point 40°–60°.

I claim:

1. A compound of the formula

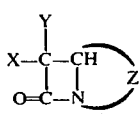

wherein X and Y together are hydrazono or X is hydrazino, Y is hydrogen, and Z is a group of the formula

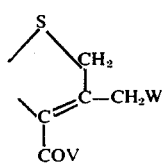

in which COV is carboxy or a lower alkyl, halo(lower alkyl) or aralkyl ester thereof and W is hydrogen, a free hydroxy group, an acetoxy group, or the residue of the nucleophile of the formula

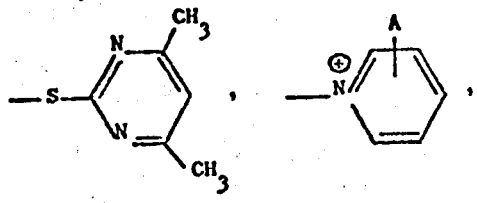

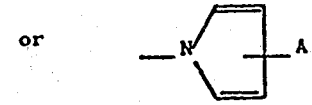

and A is hydrogen or a fused benzo group, or COV and W together are a lactone or a lactam group, the sulphur atom being bonded to the carbon rather than the nitrogen atom of the 2-azetidone ring, or a metallic salt thereof.

2. A compound of the formula

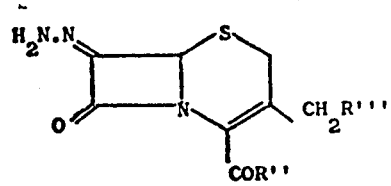

wherein COR″ is carboxy or a lower alkyl, halo(lower alkyl) or aralkyl ester thereof and R‴ is hydrogen, a free hydroxy group, acetoxy, or the residue of a nucleophile of the formula

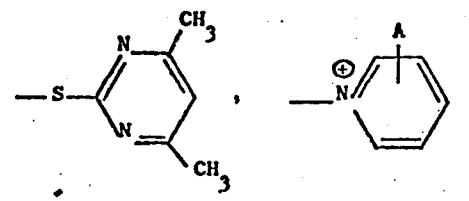

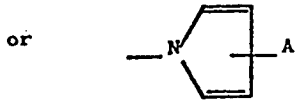

and A is hydrogen or a fused benzo group, or COR″ and R‴ together are a lactone or a lactam group, or a metallic salt thereof.

3. A compound according to claim 2, wherein COR″ is a carboxy, lower alkyl, halo(lower alkyl) or aralkyl ester.

4. A compound according to claim 2, wherein R‴ is hydrogen, hydroxy, acetoxy, or a nucleophilic residue of the formula

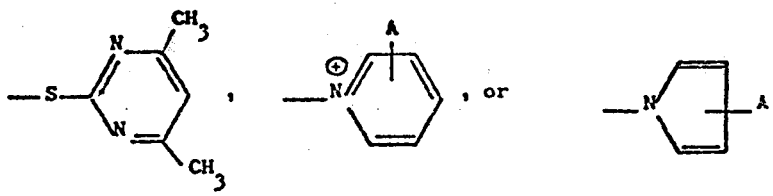

wherein A is hydrogen or a fused benzo group, or COR'' and R''' together are a lactone group.

5. A compound according to claim 4, wherein R''' is hydrogen, hydroxy, acetoxy or 1-pyridyl, or COR'' and R''' together are a lactone group.

6. A compound according to claim 2 in the form of a complex with a triphenyl-, tribenzyl- or tri-lower-alkyl-substituted phosphine oxide.

7. A compound according to claim 6, wherein the complex is with triphenyl phosphine oxide.

8. A compound according to claim 2, selected from the group consisting of 7-hydrazono-3-acetoxymethyl-ceph-3-em-4-carboxylic acid, 7-hydrazono-3-hydroxymethylceph-3-em-4-carboxylic acid, 7-hydrazono-3-hydroxymethylceph-3-em-4-carboxylic acid lactone, 7-hydrazono-3-methylceph-3-em-4-carboxylic acid, (7-hydrazono-ceph-3-em-3-yl methyl) pyridinium 4-carboxylate, or a salt thereof.

9. A compound according to claim 8 in the form of a complex with triphenyl phosphine oxide.

10. A process for the preparation of a cephalosporin substituted at the 3-position of the 2-azetidone ring by a hydrazono group which comprises reducing a cephalosporin substituted at the 3-position of the 2-azetidone ring by a diazo group with a triphenyl-, tribenzyl- or tri-lower-alkyl-substituted phosphine to give the hydrazone or one convertible thereto and, in the latter instance, effecting the conversion to the desired hydrazone compound.

11. A process according to claim 10, wherein the reducing agent is triphenyl phosphine.

12. A process according to claim 10, which comprises isolating the hydrazono compound as a complex with the oxide of the tri-substituted phosphine.

* * * * *